US012726478B2

(12) United States Patent
Le Guillou et al.

(10) Patent No.: US 12,726,478 B2
(45) Date of Patent: Sep. 1, 2026

(54) ACCESS CONTROL TO A WIRELESS COMMUNICATION NETWORK BY AUTHENTICATION BASED ON A BIOMETRIC PRINT OF A USER

(71) Applicant: ORANGE, Issy-les-Moulineaux (FR)

(72) Inventors: Xavier Le Guillou, Chatillon Cedex (FR); Coralie Bonnet, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 252 days.

(21) Appl. No.: 18/552,158

(22) PCT Filed: Feb. 21, 2022

(86) PCT No.: PCT/FR2022/050307

§ 371 (c)(1),
(2) Date: Sep. 22, 2023

(87) PCT Pub. No.: WO2022/200704

PCT Pub. Date: Sep. 29, 2022

(65) Prior Publication Data

US 2024/0305630 A1 Sep. 12, 2024

(30) Foreign Application Priority Data

Mar. 25, 2021 (FR) ...................................... 2103014

(51) Int. Cl.
*H04L 9/40* (2022.01)
*H04W 12/06* (2021.01)

(52) U.S. Cl.
CPC ......... *H04L 63/0861* (2013.01); *H04W 12/06* (2013.01)

(58) Field of Classification Search
CPC ............. H04L 63/0227; H04L 63/0236; H04L 63/0861; H04L 63/0876; H04L 63/083;
(Continued)

(56) References Cited

U.S. PATENT DOCUMENTS 7,548,981 B1 * 6/2009 Taylor ................ H04L 63/0861 709/227
2005/0135661 A1 * 6/2005 Mimura .................. G07C 9/37 382/124

(Continued)

FOREIGN PATENT DOCUMENTS

CN 107070754 A 8/2017
CN 103679436 B 8/2018

(Continued)

OTHER PUBLICATIONS

Menezes et al., "Chapter 10, Identification and Entity Authentication" from the Handbook of Applied Cryptography, CRC Press, 1996.

(Continued)

*Primary Examiner* — Eric W Shepperd
(74) *Attorney, Agent, or Firm* — Knobbe, Martens, Olson & Bear, LLP

(57) ABSTRACT

A method for access control to a wireless local area communication network, including a gateway for accessing the local area network and a plurality of user terminals capable of being connected to the local area network via the access gateway. The access control of one of the user terminals to the network includes: authenticating the user terminal on the basis of an item of information derived from a biometric print of a user of the user terminal, and applying, to the user terminal, a network access profile personalized for the user to whom the biometric print belongs.

16 Claims, 14 Drawing Sheets

(58) Field of Classification Search
CPC ... H04L 63/102; H04L 9/3231; H04L 9/3239; H04L 9/3297; G06F 21/32
See application file for complete search history.

(56) References Cited

U.S. PATENT DOCUMENTS

| | | | | |
|---|---|---|---|---|
| 2007/0118758 | A1* | 5/2007 | Takahashi | G06F 21/305 713/186 |
| 2008/0267511 | A1* | 10/2008 | Bourrieres | H04N 1/32133 382/209 |
| 2013/0239181 | A1* | 9/2013 | Varsavsky Waisman-Diamond | H04L 61/2514 726/4 |
| 2015/0028996 | A1* | 1/2015 | Agrafioti | G06F 21/40 340/5.82 |
| 2015/0040198 | A1* | 2/2015 | Gopalakrishnan | H04L 63/102 726/5 |
| 2015/0264573 | A1* | 9/2015 | Giordano | H04L 63/107 726/7 |
| 2017/0076076 | A1* | 3/2017 | Materna | H04L 63/0861 |
| 2018/0063857 | A1* | 3/2018 | Caplan | H04N 21/25866 |
| 2018/0109944 | A1* | 4/2018 | Kawakita | H04L 63/104 |
| 2018/0176197 | A1* | 6/2018 | Matthews | H04L 63/0807 |
| 2020/0342086 | A1* | 10/2020 | Oung | H04W 12/065 |
| 2022/0058255 | A1* | 2/2022 | Streit | G06F 21/316 |
| 2022/0229895 | A1* | 7/2022 | Ranjan | G06F 21/35 |

FOREIGN PATENT DOCUMENTS

| | | | |
|---|---|---|---|
| EP | 1791073 | A1 | 5/2007 |
| JP | 4291803 | B2 * | 7/2009 |

OTHER PUBLICATIONS

Yoichi Shibata et al., “A challenge-response authentication with a password extracted from a fingerprint”, IEICE Technical Report, Denshi Jouhou Tsuushin Gakkai, JP, vol. 104, No. 199, Jan. 1, 2004, pp. 179-186.

International Search Report for International Application No. PCT/FR2022/050307 dated Apr. 13, 2022.

Alexander et al., “DHCP Options and BOOTP Vendor Extensions”, Network Working Group, Request for Comments 2132, Standards track, Mar. 1997.

Droms, “Dynamic Host Configuration Protocol”, Network Working Group, Request for Comments 2131, Standards track, Mar. 1997.

Kaliski, “PKCS #5: Password-Based Cryptography Specification Version 2.0”, Network Working Group, Request for Comments 2898, Informational, Sep. 2000.

* cited by examiner

ACCESS CONTROL TO A WIRELESS COMMUNICATION NETWORK BY AUTHENTICATION BASED ON A BIOMETRIC PRINT OF A USER

CROSS-REFERENCE TO RELATED APPLICATIONS

This application is filed under 35 U.S.C. § 371 as the U.S. National Phase of Application No. PCT/FR2022/050307 entitled "ACCESS CONTROL TO A WIRELESS COMMUNICATION NETWORK BY AUTHENTICATION BASED ON A BIOMETRIC FINGERPRINT OF A USER" and filed Feb. 21, 2022, and which claims priority to FR 2103014 filed Mar. 25, 2021, each of which is incorporated by reference in its entirety.

CROSS-REFERENCE TO RELATED APPLICATIONS

This application is filed under 35 U.S.C. § 371 as the U.S. National Phase of Application No. PCT/FR2022/050307 entitled "ACCESS CONTROL TO A WIRELESS COMMUNICATION NETWORK BY AUTHENTICATION BASED ON A BIOMETRIC FINGERPRINT OF A USER" and filed Feb. 21, 2022, and which claims priority to FR 2103014 filed Mar. 25, 2021, each of which is incorporated by reference in its entirety.

BACKGROUND

Technical Field

The field of the development is that of access control of user terminals to a local area communication network, accessible via an access gateway. The development relates notably, but not exclusively, to the issues of planning the access of user terminals to such a local area communication network, and of parental control for underage users.

Prior Art

Planning the access of user terminals to the resources of a local area communication network, particularly a home network, and of the Internet wide area communication network it provides access to, is a major issue for communication network operators, as well as for stakeholders offering OTT (over-the-top) services, who need to earn the trust of their customers.

In particular, the issue of parental control, to secure the access of underage users to these resources, is a major challenge for households with children.

It is therefore important for parents, on the one hand, to be able to plan with certainty the times at which their children are authorised to access these resources, in order, for example, to reduce the risk of screen addiction, and, on the other hand, to control their access only to resources that are not likely to offend their sensibilities, harm them or simply expose them to inappropriate content.

To date, in a home local area communication network, this access planning and this parental control are implemented in the access gateway (for example, the Orange® Livebox®). The latter's role is to control the access of user terminals to the communication network, by automatically configuring the IP parameters of the latter and, in particular, by automatically assigning them an IP (Internet Protocol) address.

According to known techniques, this control is entirely based on the MAC (Media Access Control) address declared by the user terminal to the DHCP (Dynamic Host Configuration Protocol) server of the local area network. This is referred to as MAC address filtering. This MAC address is a physical identifier stored in a network adapter or a similar network interface, generally consisting of 48 bits and represented in hexadecimal form.

The home gateway stores a correspondence table, enabling access permissions to be associated with the different MAC addresses of the user terminals of the local area network. For example, the MAC address of an underage user's smartphone is recorded in association with certain authorisation rules restricting their access to certain time slots only, or to certain content only. This correspondence table is generated by the network administrator (the customer parent) when setting access authorisations for all the user terminals in the home, and stored as a static table in the gateway.

However, this access control based on the MAC address of the user terminals poses two main problems to date.

A first problem is that any user can now easily change the software MAC address of their terminal. Indeed, with some operating systems (OS), the hardware MAC address is not used directly, but replaced with a software MAC address chosen by the OS. This modification of the MAC address, at software level, is within the reach of most underage users in the home, who want to circumvent the parental control or planning set by their parents. The reliability of the parental control and planning implemented in home gateways is therefore insufficient to gain the trust of customers of operators and OTT stakeholders.

A second problem stems from the fact that some mobile operating system suppliers, such as Apple® or Google®, are pushing for the use of a random MAC address for connecting to Wi-Fi networks. This would make it impossible to control the access to the home gateway through MAC address filtering.

There is therefore a need for a technique for access control of terminal users to a local area communication network, in particular a home network, that does not have these drawbacks of the prior art. In particular, there is a need for such a technique that allows access planning and parental control to be implemented with greater reliability than prior solutions. There is also a need for such a technique that is simple to implement and compatible with existing communication standards (in particular IEEE 802.11i). There is indeed a need for such a technique for an effective network access control, regardless of the terminal used by a user of the local area network.

SUMMARY

The development responds to this need by proposing a method for access control to a wireless local area communication network, comprising a gateway for accessing the local area network and a plurality of user terminals able to be connected to the local area network via said access gateway.

According to the development, the access control of one of the user terminals to the network comprises:

- authenticating the user terminal based on an item of information derived from a biometric print of a user of the user terminal, and
- applying, to the user terminal, a network access profile personalised for the user to whom the biometric print belongs.

Thus, the development is based on a completely new and inventive approach to access control to a local area communication network, particularly for the purposes of parental control and network access planning. Indeed, the development proposes that the user terminal is authenticated on the network based on an item of information derived from a biometric print of the terminal user, rather than, conventionally, based on a MAC address of the terminal. In other words, according to a new and inventive approach, it is proposed to authenticate the user of the terminal, based on their biometric print, rather than the terminal itself. This increases the reliability of parental control and network access planning, by ensuring that a personalised access profile is applied to the user terminal according to its current user, identified based on their biometric print. This advantageously avoids that a user of the network circumvents the access restrictions that should be imposed to them by borrowing the terminal of another user with greater rights.

It will be noted that biometric printing refers to a set of physical or behavioural characteristics specific to an individual, making it possible to verify their identity reliably. Such a biometric print can be a fingerprint of the user, i.e. the skin line pattern of the fingers or of the palms of the hands. It can also be a retinal scan of the user, enabling recognition of their iris, based on an iris code completed using the Daugman algorithm. It can further be a set of facial characteristics of the user (distance between the eyes, bridge of the nose, corner of the lips, ears, chin, etc.) enabling a reliable recognition of their face. Finally, such a biometric print can be constructed from a set of behavioural characteristics of an individual, for example in the case of a voiceprint of the user.

According to a first embodiment of the development, the item of information derived from the biometric print is a MAC address generated by hashing a robust representation of the biometric print.

Thus, once a biometric print of the user has been captured by the user terminal, the latter stores a robust representation of it, so as to avoid storing the biometric print itself, which could pose security problems if someone managed to get hold of it fraudulently. Robust representation refers to a reduced number of characteristics extracted from the print, but still sufficiently high for its owner to be reliably identified. A MAC address is generated by applying a hash function to this robust representation of the user's print. The user terminal then reconfigures its network interface with this generated MAC address, which is then used, at the access gateway, to authenticate the user terminal and determine the access profile, associated with the owner of the biometric print, that should be applied to it.

According to one aspect of this first embodiment, such an access control method comprises pre-registering the user terminal with the access gateway, comprising storing the MAC address generated in association with an identifier of the user.

Indeed, the MAC address used by a given user of the network is always the same, as it is directly derived from the latter's biometric print. It may therefore be advantageous, in an initial enrolment phase, to record, at the access gateway, the MAC address associated with each of the usual users of the network, in a dedicated correspondence table. The access gateway can thus easily establish the correspondence table associating the MAC addresses used by the terminals authenticating on the network and the access profiles defined by the network administrator, comprising all the rules and permissions associated with each of the identified users of the local network. This way, parental control and access planning are simplified and more reliable.

According to a second embodiment of the development, the item of information derived from the biometric print is a password generated by hashing a robust representation of the biometric print. This second embodiment is advantageous in that it requires little adaptation of the existing user terminals.

So, as in the first embodiment, after a biometric print of the user has been captured by the user terminal, the latter stores a robust representation of it, so as to avoid storing the full biometric print. It then generates a password by applying a hash function to this robust representation.

According to this second embodiment, the authentication of the user terminal is implemented on a captive portal based on an identifier of the user and a hash of the password. The user connected to the wireless local area network has no rights until they have authenticated on the captive portal, i.e. a special web page displayed in the user terminal's browser for authentication purposes prior to any access to the wide area network. After successful authentication on the captive portal, an association is established at the access gateway between the MAC address of the user terminal and the user's identity, deduced from their biometric print. It is therefore possible for the access gateway to apply the access profile to the user terminal, i.e. all the permissions and restrictions that have been defined by the network administrator for the identified user of the terminal. In this embodiment, the validity period of this access profile is linked to the period during which the captive portal is open: as soon as the user closes their session, all the access rights granted by the gateway lapse, and a new authentication on the captive portal is required for the user to regain their own access profile to the local area network.

According to this embodiment, such a method for access control comprises pre-registering the user terminal with the access gateway, comprising storing the hash of the generated password in association with an identifier of the user.

During this initial enrolment phase, the usual users of the local area network register with the access gateway by providing their identifier and the password generated by hashing the robust representation of their biometric print. This password is preferably stored in hashed form by the home gateway, in order to avoid any security problems that might be associated with its fraudulent interception by a malicious individual.

The access gateway can thus store a correspondence table associating a set of access rules and permissions with the hashed password obtained from the biometric print of each of the users.

After authentication on the captive portal, the access gateway can establish a correspondence between the MAC addresses of the user terminals and the previously recorded hashed passwords. It therefore directly deduces the correspondence table associating with each of the MAC addresses of the user terminals all the rules and permissions making up their access profile. This way, parental control and network access planning are simplified and more reliable.

According to a third embodiment of the development, the item of information derived from the biometric print is a MAC address derived, based on a timestamp item of information, from a hash of a robust representation of the biometric print. This third embodiment is advantageous in that it satisfies the constraints currently imposed on the wireless local area network market, according to which user terminals must have random and rotating MAC addresses, in order to avoid any traceability of their users. Indeed, according to this embodiment, a common key can be derived in parallel, on the user terminal and on the home gateway, which enables the same MAC address to be calculated on each of the two items of equipment, based on the user's biometric print and an item of timestamp information, corresponding, for example, to the current time. Thus, the MAC address used by the user terminal changes with each new request to access the local area network, but it is always known to the access gateway, that can therefore easily associate it with an identifier of the user of the terminal, and therefore with the access permissions and restrictions granted to them by the network administrator.

To do this, such a method for access control advantageously comprises pre-registering the user terminal with the access gateway, comprising storing the hash of the representation of the biometric print in association with an identifier of the user.

Thus, after scanning the user's biometric print on the terminal they use, the terminal performs an initial transformation of the entered print in order to extract from it a robust representation that uniquely identifies the user, but does not allow the print to be reversibly reconstructed. The user terminal then registers with the access gateway, providing an identifier of the user and the robust representation of the print, which are stored in association at the gateway, after potential hashing. It is from this robust representation stored for each of the registered users of the local area network that the access gateway can at any time calculate the MAC address of the user terminal that wants to access the network.

According to an advantageous aspect of this embodiment, the authentication comprises the generation, by the access gateway, of at least two candidate MAC addresses for the user terminal, from a hash of the robust representation of the stored biometric print and at least two items of timestamp information in close temporal proximity, and the comparison of the candidate MAC addresses with the item of information derived from the biometric print received from the user terminal.

Thus, by generating several candidate MAC addresses on the access gateway side, such a method according to one embodiment of the development is robust to possible clock shifts between the user terminal and the gateway. Depending on the reliability of time synchronisation of the two items of equipment, a more or less fine granularity can be chosen, and therefore two items of timestamp information that are more or less close in time. For example, it is possible to choose a granularity of 5 minutes, and to calculate two MAC addresses from the biometric print on the one hand, and two items of timestamp information 5 minutes apart from each other. Thus, each time a new user terminal previously registered on the local network connects, the access gateway calculates these two candidate MAC addresses and compares them with the MAC address provided by the user terminal in its DHCP request. In case there is a correspondence, the gateway can apply to the terminal the access rights that are specific to its owner. Otherwise, the gateway can apply to the unrecognised terminal a default access policy.

Naturally, it is possible to choose a finer or coarser time granularity, and even to calculate more than two candidate MAC addresses if necessary.

The development also relates to a computer program product comprising program code instructions for implementing a control access method as described previously, when it is executed by a processor.

The development also relates to a computer-readable storage medium on which is saved a computer program comprising program code instructions for implementing the steps of the access control method according to the development as described above. Such a storage medium can be any entity or device able to store the program. For example, the medium can comprise a storage means, such as a ROM (Read-Only Memory), for example a CD-ROM (Compact Disc Read-Only Memory) or a microelectronic circuit ROM, or a magnetic recording means, for example a USB (Universal Serial Bus) flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the development can be downloaded in particular on a network, for example the Internet network.

Alternatively, the storage medium can be an integrated circuit in which the program is embedded, the circuit being adapted to execute or to be used in the execution of the above-mentioned access control method.

The development further relates to a gateway for accessing a wireless local area communication network, the local area network comprising a plurality of user terminals able to be connected to the local area network via the access gateway. According to the development, such an access gateway comprises:

- a module for authenticating a user terminal based on an item of information derived from a biometric print of a user of the user terminal, and
- a module for controlling the access of the authenticated user terminal, configured to apply to the user terminal a network access profile personalised for the user to whom the biometric print belongs.

Such an access gateway is configured to implement the access control method as described previously.

The development also relates to a method for access of a user terminal to a gateway for accessing a wireless local area communication network, which comprises:

- capturing a biometric print of a user;
- deriving an item of user authentication information from the captured biometric print;
- transmitting an access request to the access gateway based on the derived item of information.

According to a particular aspect, deriving an item of authentication information comprises:

- transforming the captured print into a robust representation of the print;
- generating a MAC address by hashing the robust representation of the print; and, prior to transmitting an access request, such an access method comprises configuring a network interface of the user terminal with the generated MAC address.

According to an embodiment variant, generating a MAC address also implements a derivation function based on an item of timestamp information.

The development further relates to a computer program product comprising program code instructions for implementing an access method as described above, when it is executed by a processor.

The development also relates to a computer-readable storage medium on which is saved a computer program comprising program code instructions for implementing the steps of the method according to the development as described above.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the development can be downloaded in particular on a network, for example the Internet network.

Alternatively, the storage medium can be an integrated circuit in which the program is embedded, the circuit being adapted to execute or to be used in the execution of the above-mentioned access method.

The development finally relates to a user terminal able to be connected to a wireless local area communication network via an access gateway, that comprises:

- a module for capturing a biometric print of a user;
- a module for deriving an item of user authentication information from the captured biometric print;
- a module for transmitting an access request to the access gateway based on the derived item of information.

The above-mentioned corresponding access gateway, user terminal and computer program have at least the same advantages as those provided by the access and access control methods according to the present development.

BRIEF DESCRIPTION OF THE DRAWINGS

Other purposes, features and advantages of the development will become more apparent upon reading the following description, hereby given to serve as an illustrative and non-restrictive example, in relation to the figures, among which.

DETAILED DESCRIPTION OF CERTAIN ILLUSTRATIVE EMBODIMENTS

The general principle of the development is based, in the context of access control of user terminals to a wireless local area communication network, on authenticating the users themselves, rather than the terminals they use, using an item of information derived from a biometric print of the users. In this way, it is possible to increase the reliability of access control, by ensuring that the access permissions and restrictions set by the network administrator are correctly applied to each of the users, regardless of the user terminal they use. Network access planning and parental control for underage users are thus secure, giving customers greater confidence in the service provided by their service provider.

Figure 1:
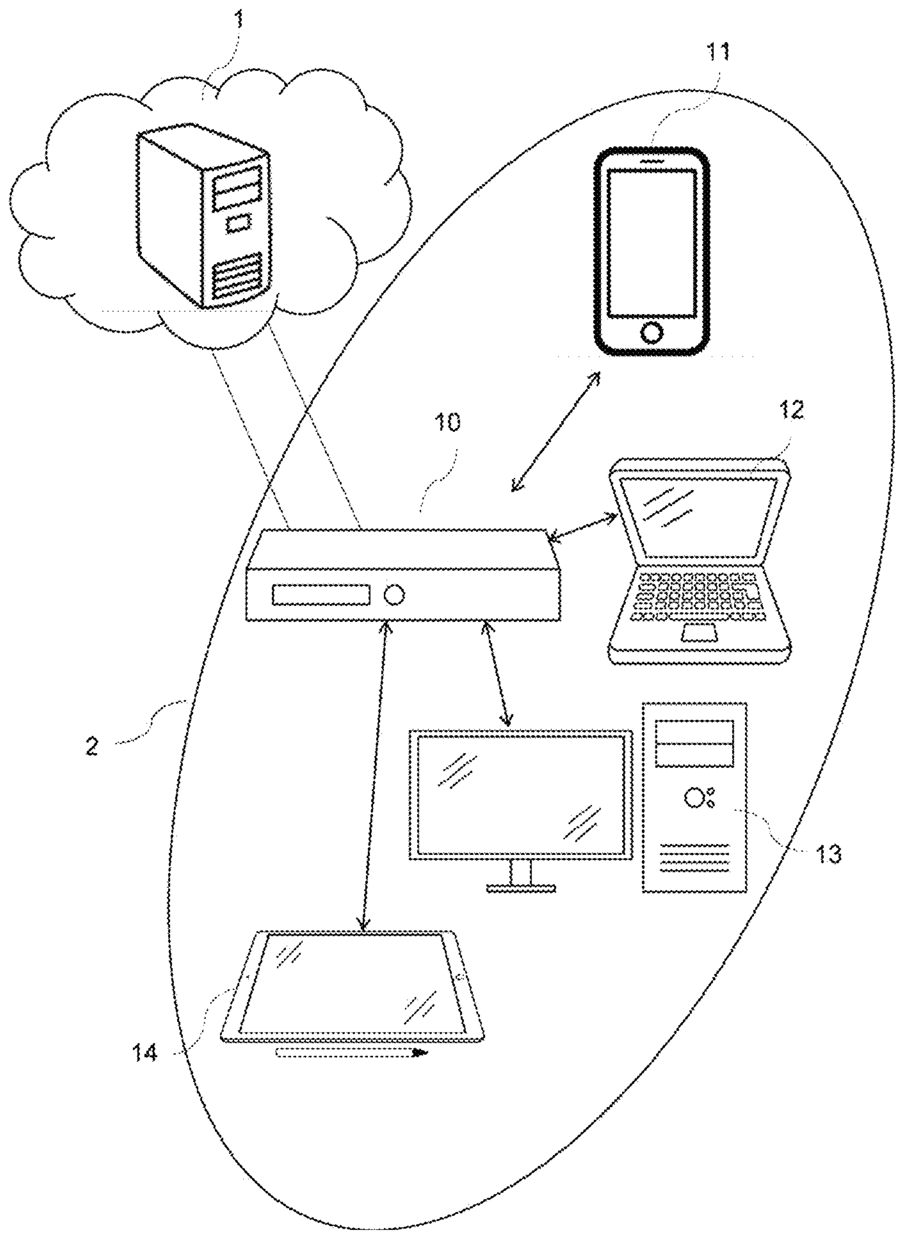
FIG. 1 shows a home wireless local area communication network comprising an access gateway and several user terminals.

In relation to FIG. 1, a wireless local area communication network, for example a family Wi-Fi network, is now presented. Such a home network 2 comprises a home gateway 10, for example an Orange® Livebox®, and a plurality of user terminals, for example a smartphone 11, a laptop 12, a PC (Personal Computer) type home computer 13, and a tablet 14. These various user terminals can connect to the home gateway 10, as symbolised by the double arrows in FIG. 1, to access the resources of the local area communication network 2, or the resources of a wide area communication network 1, for example the Internet network, to which the gateway 10 forms an access point. In addition, it is considered as an example that this home network is that of a family with two parents and two underage children, Alice and Bob. The smartphone 11 and the laptop 12, for example, are used exclusively by each of the two parents, while Alice and Bob can both use the family computer 13 or the tablet 14.

In order to limit the amount of time Alice and Bob spend in front of screens, and to avoid any addiction phenomenon, it is important for their parents to be able to plan the time slots during which Alice and Bob are authorised to connect to the home gateway 10. These time slots are not necessarily the same for Alice and Bob. For example, Alice is authorised from 4 pm to 9 pm, and Bob is authorised from 4 pm to 7 pm.

In addition, it is also important to set up parental control to limit Alice's or Bob's access to only age-appropriate content available on the wide area communication network 1. Again, this content is not necessarily the same for Alice and Bob.

It is therefore important for parents to be able to set up a set of permissions, or access rules, that are personalised according to the identify of Alice or Bob. As administrators of the home gateway 10 and the local area network 2, they can configure these rules in the home gateway 10, where they are stored in the form of a correspondence table associating the identity of each user in the family with a set of rules or access rights assigned to them.

In order to implement reliable access control complying with these rules and permissions, the method according to the development is based, in its various embodiments, on the use of a biometric print of the user, or an item of information derived therefrom, for their authentication on the local area network.

Generally, such a biometric printing corresponds to a set of physical or behavioural characteristics specific to the user, making it possible to verify their identity reliably. Such a biometric print can be a retinal pattern of the user, enabling recognition of their iris, based on an iris code completed using the Daugman algorithm. It can also be a set of facial characteristics of the user (distance between the eyes, bridge of the nose, corner of the lips, ears, chin, etc.) enabling a reliable recognition of their face. Such a biometric print can yet be constructed from a set of behavioural characteristics of an individual, for example in the case of a voiceprint of the user.

Various embodiments of the development, in which the biometric print is a fingerprint of the user, i.e. the skin line pattern of one of their fingers, are more specifically described in the remainder of this document. This is only an illustrative example, and any other type of biometric print can also be used, without falling outside the scope of the development.

Scanning such a fingerprint is particularly easy on user terminals with touch screens, such as smartphones. By placing their finger on the terminal screen, the user can provide the terminal with an image of their fingerprint, that enables them to be uniquely identified. Indeed, fingerprints, also known as dactylograms, are unique to each individual, and each finger has its own print. The probability of two people having the same fingerprints is estimated to be one in 64 billion.

More specifically, it is possible to characterise an individual's fingerprint based on local singular points, also known as minutiae, observed on the loops, spirals or arches that make up the most common patterns of a fingerprint. Minutiae are relatively robust to variations in fingerprints, and it is generally estimated that a set of twelve minutiae is sufficient to authenticate an individual reliably.

Figure 2:
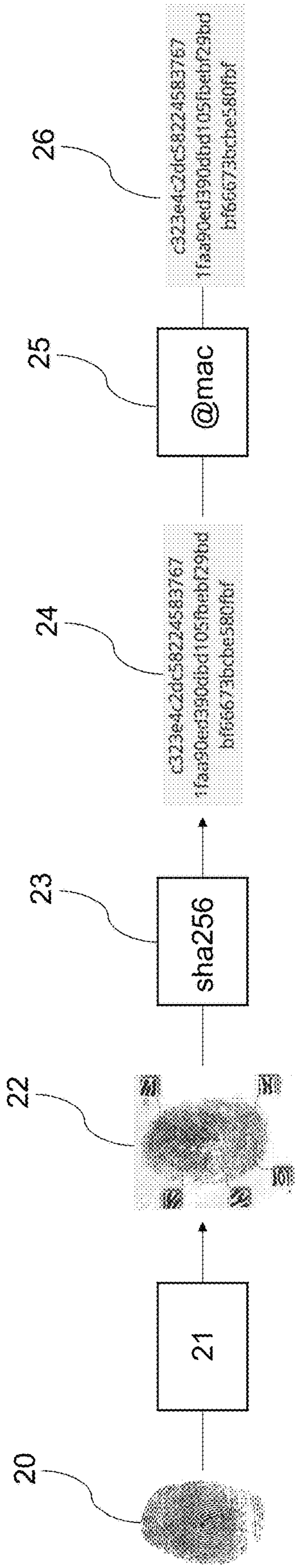
FIG. 2 illustrates, according to a first embodiment of the development, a technique for generating a MAC address from a print of a user.
Figure 3:
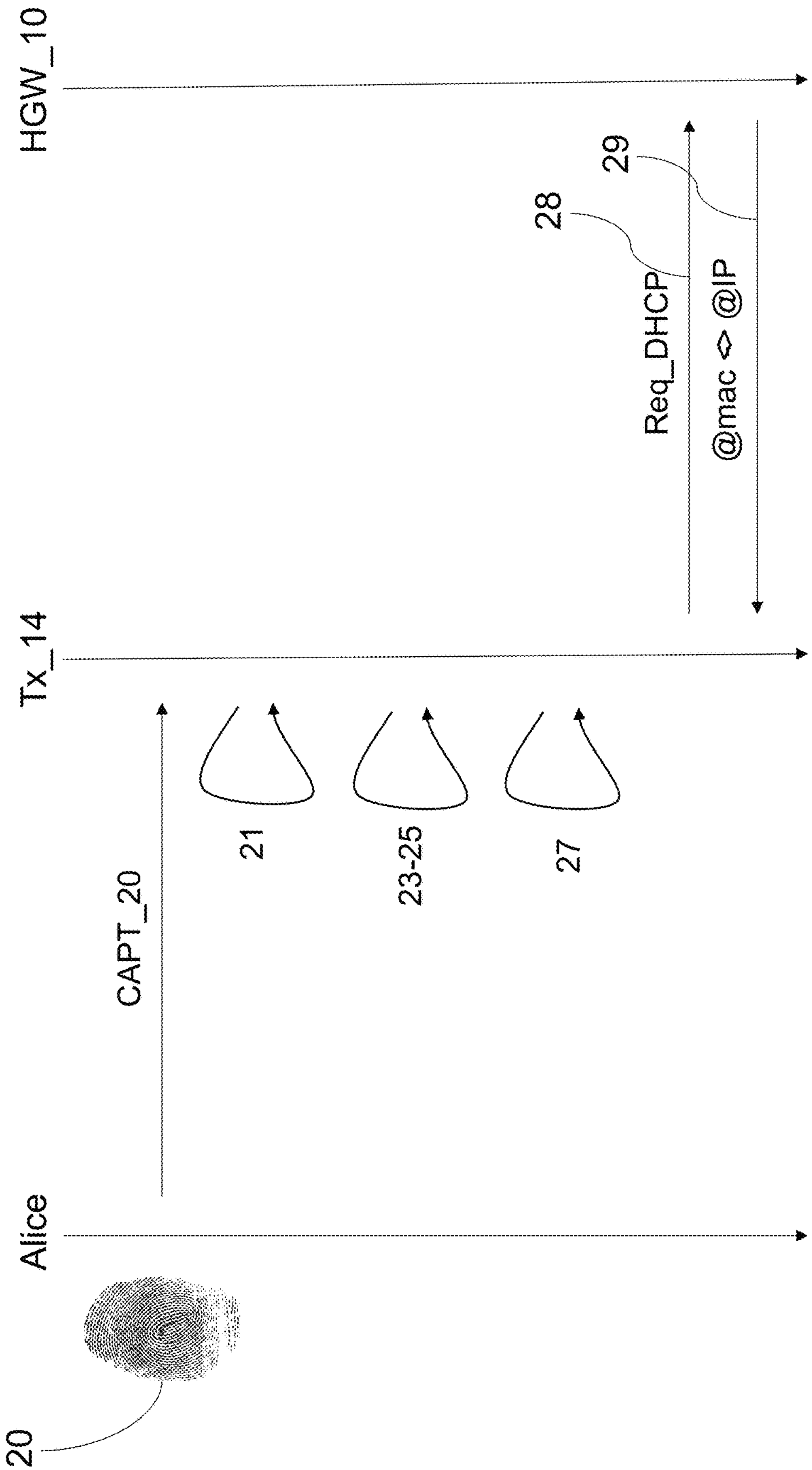
FIG. 3 describes in the form of a flowchart the steps implemented when connecting a user terminal to the access gateway according to this first embodiment.
Figure 4:
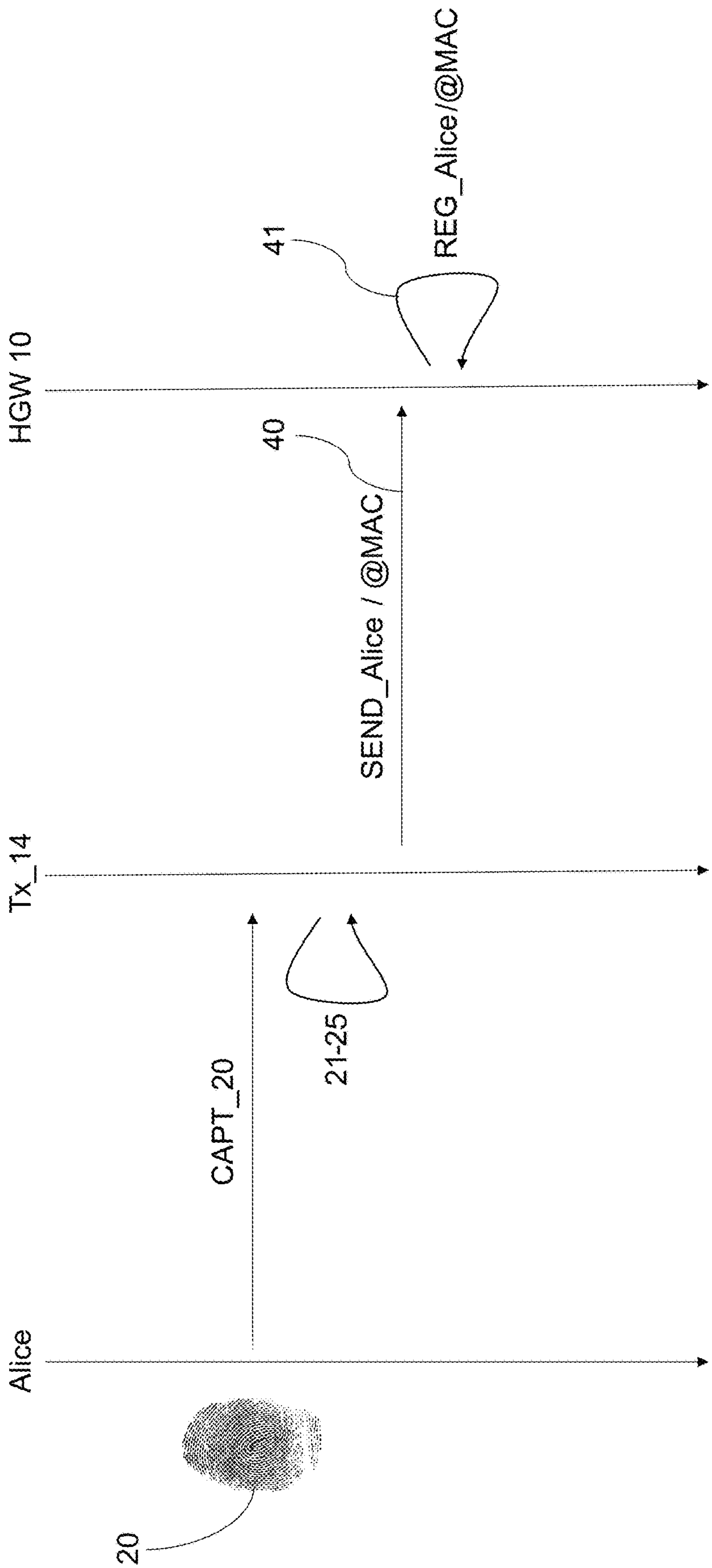
FIG. 4 shows in the form of a flowchart a preliminary phase of registering a user terminal with the access gateway according to this first embodiment.
Figure 5:
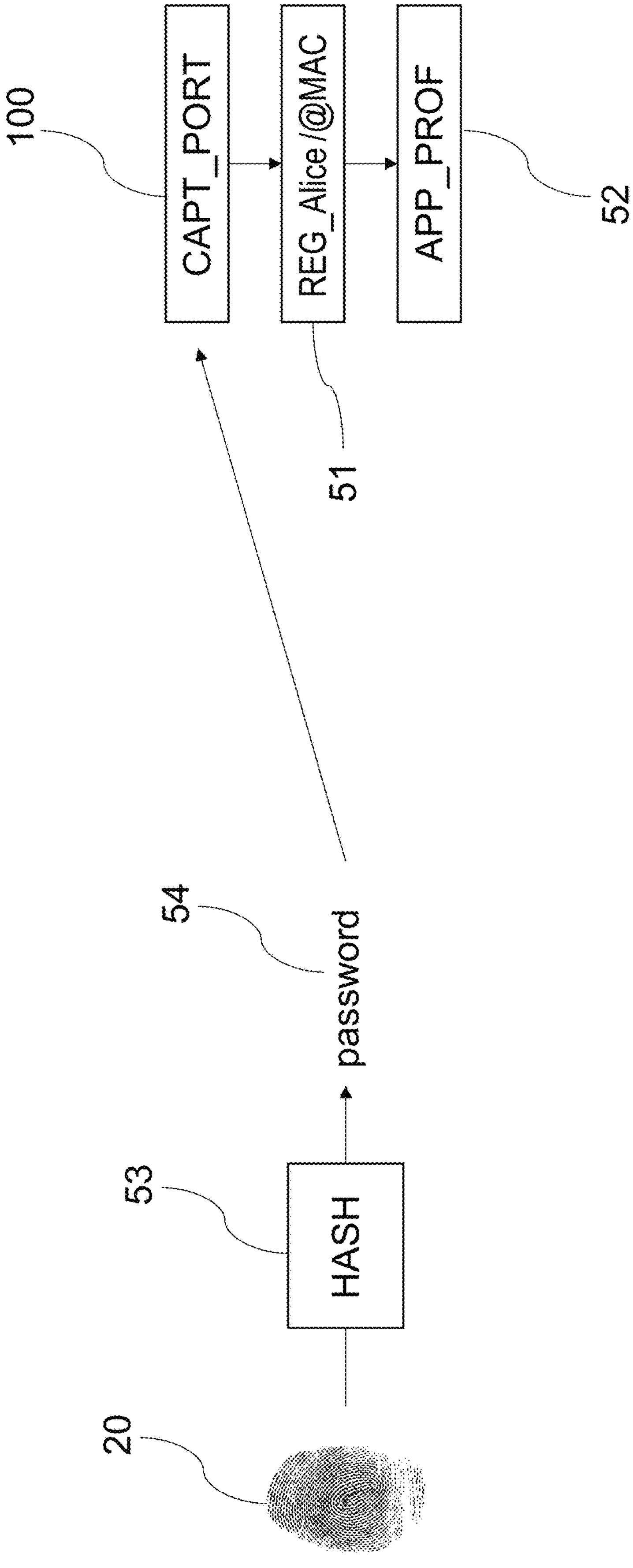
FIG. 5 illustrates in the form of a flowchart a second embodiment of the development, in which the item of information derived from a user's biometric print is a password used to authenticate the user terminal on a captive portal.

In relation to FIGS. 2 to 4, a first embodiment of the development, according to which such a fingerprint is used, by the user terminal itself, to generate a substitute MAC address, is now described.

It is recalled that the MAC (Media Access Control) address is a six-byte hexadecimal string that identifies an Ethernet card. The MAC address of a user terminal is therefore a priori set by the manufacturer of its network adapter. Although they are physically stored in the Ethernet cards, these addresses can be modified in the software layers of communication protocols. This is what is proposed by this first embodiment of the development, according to which the user terminal generates an IPv4 or IPv6 MAC address by non-reversible hashing of its user's fingerprint, which it substitutes for its initial MAC address when attempting to connect to the access gateway.

FIG. 2 illustrates more particularly the sequence of steps implemented within a user terminal (for example the smartphone 11 or the tablet 14 of FIG. 1) for such a MAC address generation, derived from a fingerprint.

In a step referenced 20, the user Alice enters her fingerprint by placing her finger (for example her right index finger) on the screen of the tablet 14. An algorithm for processing 21 the image of this fingerprint is used to extract a certain number of local singular points, also known as minutiae, sufficient in number to allow robust, or reliable, identification of Alice. In FIG. 2, for the sake of simplicity, only five minutiae have been illustrated, but it is generally considered in France that the use of twelve minutiae ensures reliable identification of individuals based on their fingerprints. Upon completion of this robust transformation 21 of Alice's fingerprint, a robust representation 22 of her print is obtained, which makes it possible to identify Alice reliably, but which does not make it possible to reconstruct her full fingerprint reversibly, the confidentiality and protection of which therefore remain assured. This robust representation 22 is preferably stored in the user terminal.

The user terminal 14 applies to this robust representation 22 a hash function 23, for example of the sha-256 (Secure Hash Algorithm), sha-1 or even md5 (Message Digest) type. It is recalled that the hashing technique consists in converting a series of bytes into a fingerprint deemed to be unique, and has many applications, such as validating the integrity of a file (checksum) or enabling two parties (a server and a client) to prove to each other they have a shared secret without it circulating on the network. In this case, the hash 23 of the robust representation 22 of Alice's fingerprint delivers a sequence 24 of sixty-four hexadecimal characters, that can be truncated in a step referenced 25 to retain only the first six bytes, namely twelve hexadecimal characters, that have the direct structure of a MAC address 26. Other MAC address generation functions 25, possibly more complex and more rigorous, can be used as a variant of this simple truncation, such as, for example, a PBKDF2 (Password-Based Key Derivation Function 2, a key derivation function belonging to the family of Public Key Cryptography Standards, more specifically PKCS #5 v2.0) key derivation function.

FIG. 3 illustrates in the form of a flowchart the various steps implemented between the user terminal 14 and the home gateway HGW 10, when Alice attempts to access the local area communication network. As previously illustrated in relation to FIG. 2, Alice enters her print 20 on the screen of the tablet 14, in a step referenced CAPT_20. The latter undergoes a robust transformation 21, from which a MAC address 26 (FIG. 2) is generated, in the previously described successive steps referenced 23 to 25. The tablet Tx_14 then reconfigures 27 its network interface with the MAC address 26 it just generated from Alice's fingerprint 20. This is the MAC address 26 it indicates in the DHCP request 28 it sends to the access gateway HGW 10, when attempting to connect to the local area communication network 2. In a step referenced 29, the access gateway HGW 10 stores in association the IP address of the terminal Tx_14 and the MAC address 26 appearing in its DHCP request 28.

According to this first embodiment, the user terminal 14 is authenticated in a classical way, based on the MAC address announced by the terminal in its DHCP request. The DHCP server associates a dynamic IP address with the self-declared MAC address, in accordance with the IETF (Internet Engineering Task Force) standards RFC (Request for Comments) 2131 and RFC 2132. A software layer confirms the association of permissions with this particular MAC address.

In an optional variant, shown in FIG. 4, a pre-registration phase of each of the users of the local area communication network 2 enables the access gateway HGW 10 to record in association an identifier of each of the users (for example, their first name: Alice or Bob or Parent1 or Parent2) and the MAC address, that will be derived from their fingerprint. During this initial pre-registration phase, the user (in this case, Alice) enters their fingerprint 20 on their terminal, which captures it in a step CAPT_20. In accordance with steps 21 to 25 previously described in relation to FIG. 2 (robust transformation of the print, hashing, truncation or key derivation), the terminal Tx_14 generates a MAC address 26 from this biometric print 20. The terminal Tx_14 then sends the access gateway HGW 10 a message containing Alice's identifier and the MAC address 26 it has generated from her print 20, in a step referenced 40 (SEND-_Alice/@MAC). Upon receipt, the access gateway HGW 10 stores in association in a correspondence table an identifier of the user, for example Alice, and the MAC address 26 generated by the terminal Tx_14 from the fingerprint 20 entered by Alice (step referenced 41, REG_Alice/@MAC).

For management of parental control and local area communication network access planning for the various users, the access gateway HGW 10 also keeps in memory a permission table, which is a correspondence table associating an identifier of the users and at least one rule for controlling user access to the access gateway. Indeed, the network administrator (for example, the parent) can configure a number of authorisation or prohibition rules (that is, permissions) associated with each user. The access gateway stores all these rules in a static correspondence table. For example, for the underage user Alice, access to the Internet network is only authorised between 4 pm and 8 pm.

Thanks to the joint use of the permission table and the MAC address table, it is thus easy to identify the association between user access control rules and MAC addresses of the user terminals, and therefore to plan Internet access reliably or to implement effective and secure parental control.

The home gateway stores a correspondence table, obtained by merging the permission table and the MAC address table, enabling access permissions to be associated with the various MAC addresses of the user terminals of the local area network. For example, the MAC address of an underage user's smartphone 11 is recorded in association with certain authorisation rules enabling their access to be restricted to certain time slots only, or to certain content only. This correspondence table can be stored as a static table in the gateway.

In relation to FIGS. 5 to 8, a second embodiment of the development, in which the item of information derived from a user's biometric print is a password used to authenticate the user terminal on a captive portal, is now presented. The general principle of this second embodiment is illustrated in the form of a flowchart in FIG. 5. The user, for example Alice, enters their fingerprint 20 on one of the user terminals of FIG. 1, for example by placing it on the touch screen of the tablet 14.

By hashing 53, a password 54 is derived from this biometric print 20, which the user terminal uses to authenticate on a captive web portal CAPT_PORT 100 hosted by the access gateway. Upon completion of this authentication, it is possible to establish an association 51 between the MAC address of the user terminal and the user identifier, and therefore to apply 52 to the terminal the access profile that has been defined by the network administrator for this user. Thus, the user connected to the Wi-Fi network 2 has no rights until they have authenticated on a captive web portal 100. After authentication, the association between the MAC address of the user terminal and the identity of the user is established, and it is therefore possible to apply to the terminal the network access profile that has been set up by the administrator for this user. These various steps are detailed in FIGS. 6 to 8.

Figure 6:
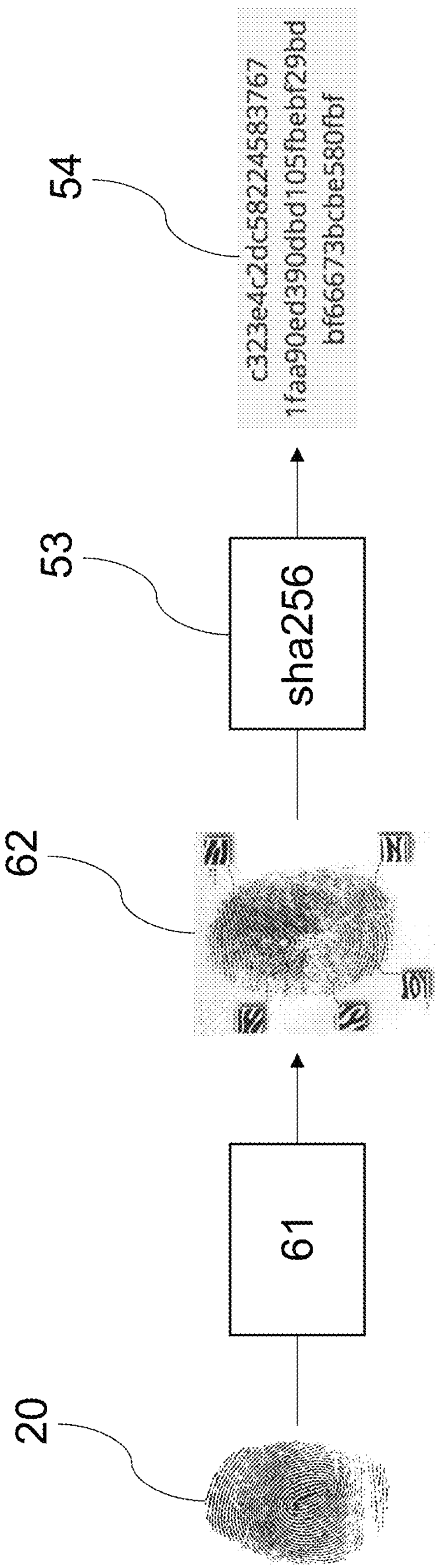
FIG. 6 illustrates more precisely the various steps for generating a password according to the embodiment of FIG. 5.

FIG. 6 illustrates more precisely the principle of generating a password from the user's biometric print, for example the fingerprint 20 that Alice has entered by placing her finger (for example her thumb) on the screen of the tablet 14. An algorithm for processing 61 the image of this fingerprint is used to extract a certain number of local singular points, also known as minutiae, sufficient in number to allow robust, or reliable, identification of Alice. In FIG. 6, for the sake of simplicity, only five minutiae have been illustrated, but it is generally considered in France that the use of twelve minutiae ensures reliable identification of individuals based on their fingerprints. Upon completion of this robust transformation 61 of Alice's fingerprint, a robust representation 62 of her print is obtained, which makes it possible to identify Alice reliably, but which does not make it possible to reconstruct her full fingerprint reversibly, the confidentiality and protection of which therefore remain assured. This robust representation 62 is preferably stored in the user terminal.

The user terminal 14 applies to this robust representation 62 a hash function 53, for example of the sha-256 (Secure Hash Algorithm), sha-1 or even md5 (Message Digest) type, that delivers a sequence 54 of sixty-four hexadecimal characters. This full hash can be used directly as a password. As a variant, a PBKDF2 key derivation function, for example, can be applied to the hash result 54 to generate a password for authentication of the user terminal on the captive portal 100.

Figure 7:
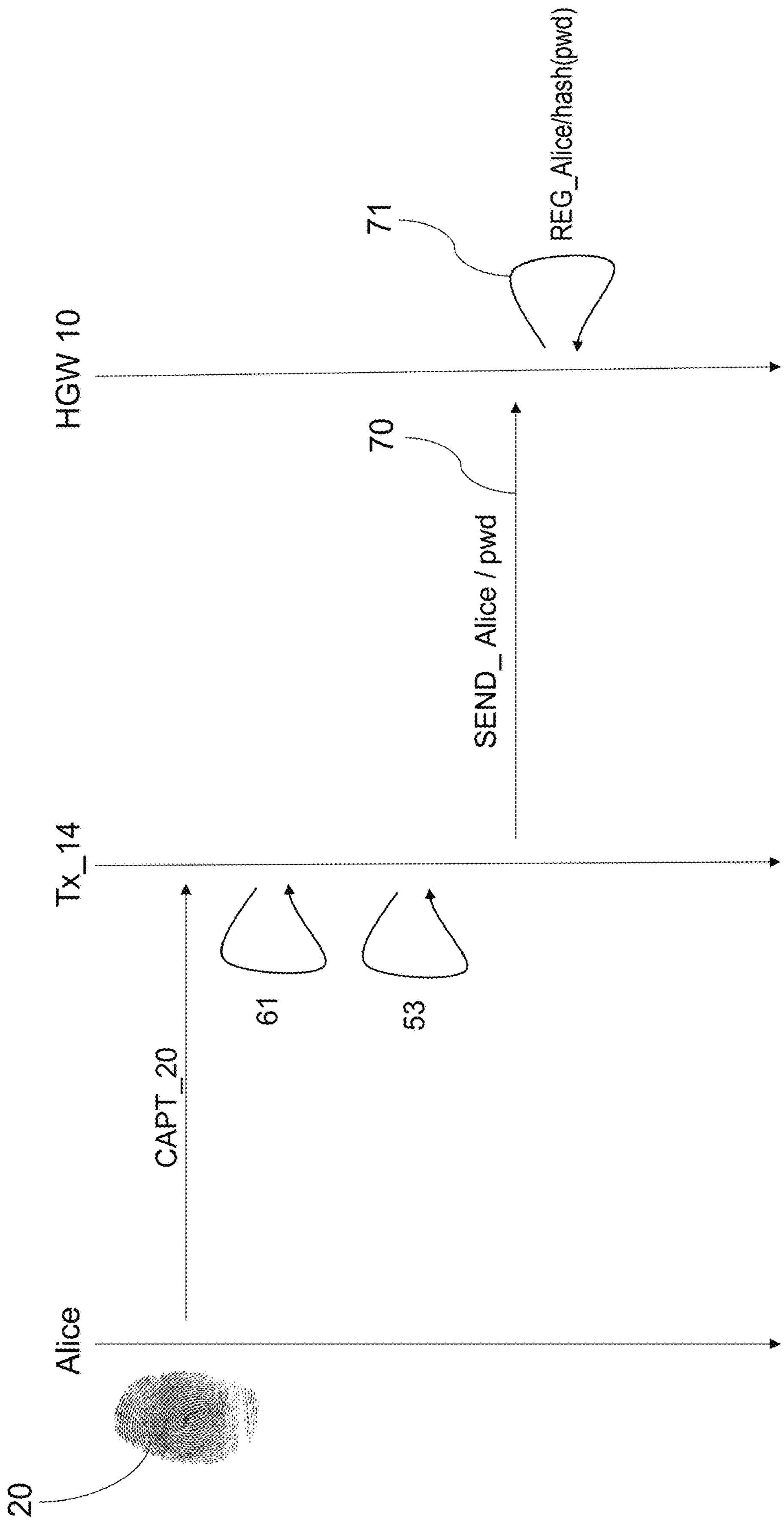
FIG. 7 shows the preliminary enrolment phase of the various users of the network with the access gateway according to the embodiment of FIG. 5.

This second embodiment requires a preliminary enrolment phase of the various network users with the access gateway HGW 10, illustrated in FIG. 7.

It can be implemented on a preliminary basis, for example when configuring the local area network 2, or when users first connect to the access gateway HGW 10. As previously indicated, the user, for example Alice, enters their fingerprint 20 on the user terminal, for example the tablet Tx_14, in a step referenced CAPT_20. The latter is converted into a robust representation in a step referenced 61, which then feeds a hash function 53, enabling a password derived from the fingerprint 20 to be generated.

In a step referenced 70, the user terminal Tx_14 sends to the home gateway HGW 10 a message containing Alice's identifier and the password 54 generated from her print (SEND_Alice/pwd). This data is stored in association in the gateway HGW 10 in a step referenced 71. Preferably, the password 54 is stored in hashed form in the home gateway (hash(pwd)), so as to guarantee its confidentiality and security. The sha-256 hash algorithm will preferably be used.

Figure 8:
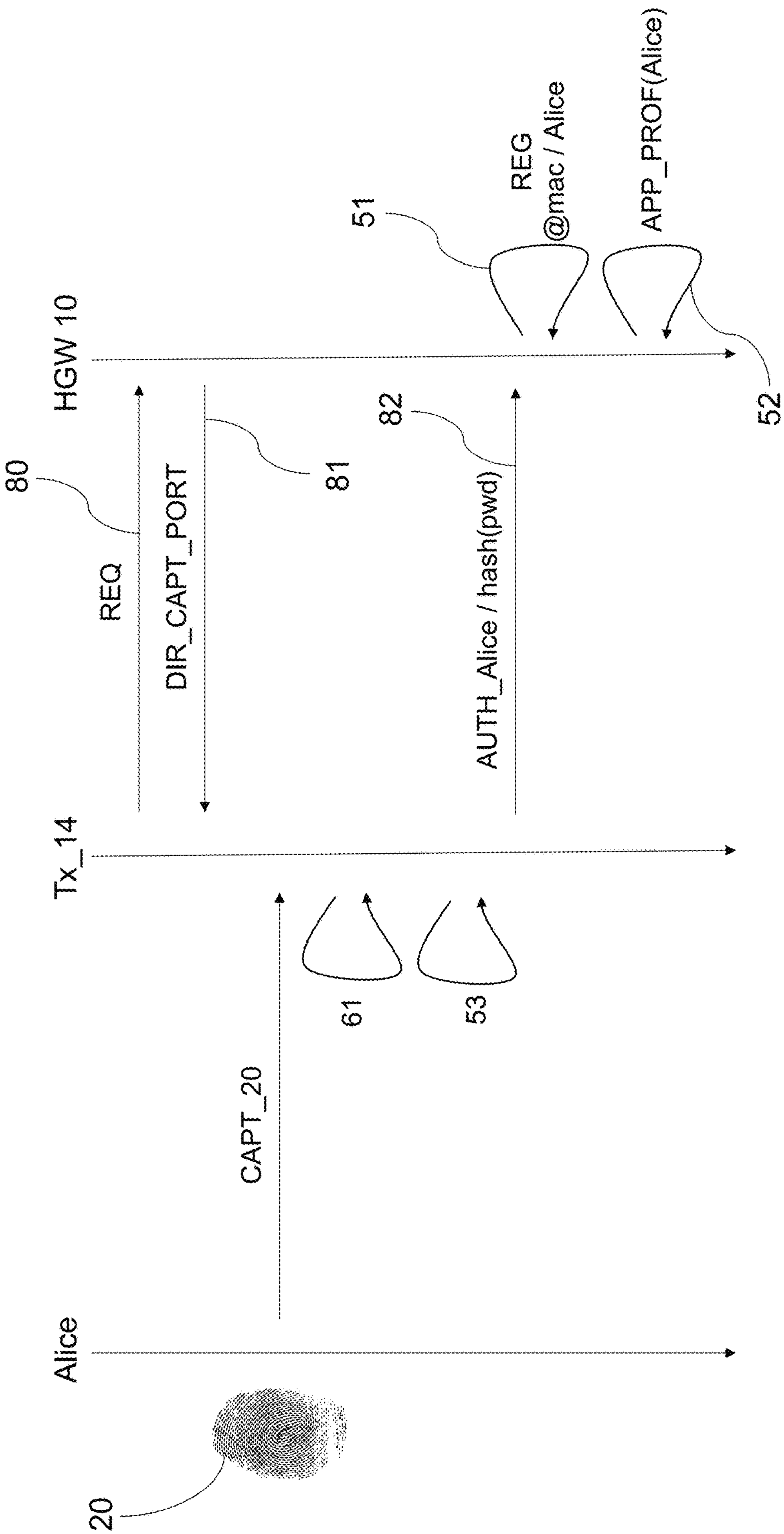
FIG. 8 illustrates the authentication mechanism implemented according to the embodiment of FIG. 5.

FIG. 8 illustrates the authentication mechanism implemented according to this second embodiment when a user terminal wants to access the wide area communication network, for example when Alice wants to browse the Web using the tablet Tx_14.

The tablet Tx_14 then sends (step referenced 80) a request REQ to the access gateway HGW 10. The latter automatically redirects the terminal 14 to a captive portal 100, in a step DIR_CAPT_PORT 81 for authentication purposes. In other words, the gateway forces the http client of terminal 14 to display a special web page, on which Alice is invited to enter her identifier and password, for authentication purposes, before she can access the Internet. Thanks to the steps previously described in relation to FIGS. 6 and 7 of entering Alice's fingerprint (20, CAPT_20), generating a password (54) that is derived therefrom (61, 53), and preliminary enrolment with the access gateway HGW 10, the terminal Tx_14 is able to transmit this authentication information to the gateway, in a step AUTH_Alice/hash(pwd) referenced 82: preferably, the password is sent to the gateway in its hashed form (hash(pwd)) using the sha-256 hash algorithm, in order to avoid any risk that the data is compromised in case of fraudulent interception.

Upon receipt, the gateway HGW 10 records in association, in a correspondence table, the MAC address of the user terminal Tx_14 and Alice's identifier in a step referenced 51. Such a correspondence table is a dynamic table, whose validity period is linked to the period during which the captive portal is open: it expires when the user closes their session.

For management of parental control and local area communication network access planning for the various users, the access gateway HGW 10 also keeps in memory a permission table, which is a correspondence table associating the password, preferably in hashed form, derived from the biometric print of each of the users and at least one rule for controlling user access to the access gateway. Indeed, the network administrator (for example, the parent) can configure a number of authorisation or prohibition rules (that is, permissions) associated with each user. The access gateway stores all these rules in a static correspondence table that associates access rules and a hashed password, as stored during the step referenced 71. For example, for the underage user Alice, access to the Internet network is only authorised between 4 pm and 8 pm.

Thanks to the joint use of the static permission table and the dynamic MAC address table, it is thus easy to identify the association between user access control rules and MAC addresses of the user terminals, and therefore to plan Internet access reliably or to implement effective and secure parental control.

By merging the static permission table and the dynamic MAC address table, the gateway HGW 10 can associate access permissions with the various MAC addresses of the user terminals of the local area network. In the example of FIG. 8, the gateway HGW 10 can thus, in a step referenced 52, apply to Alice's terminal 14 the access profile that has been defined for her by her parents.

Figure 9:
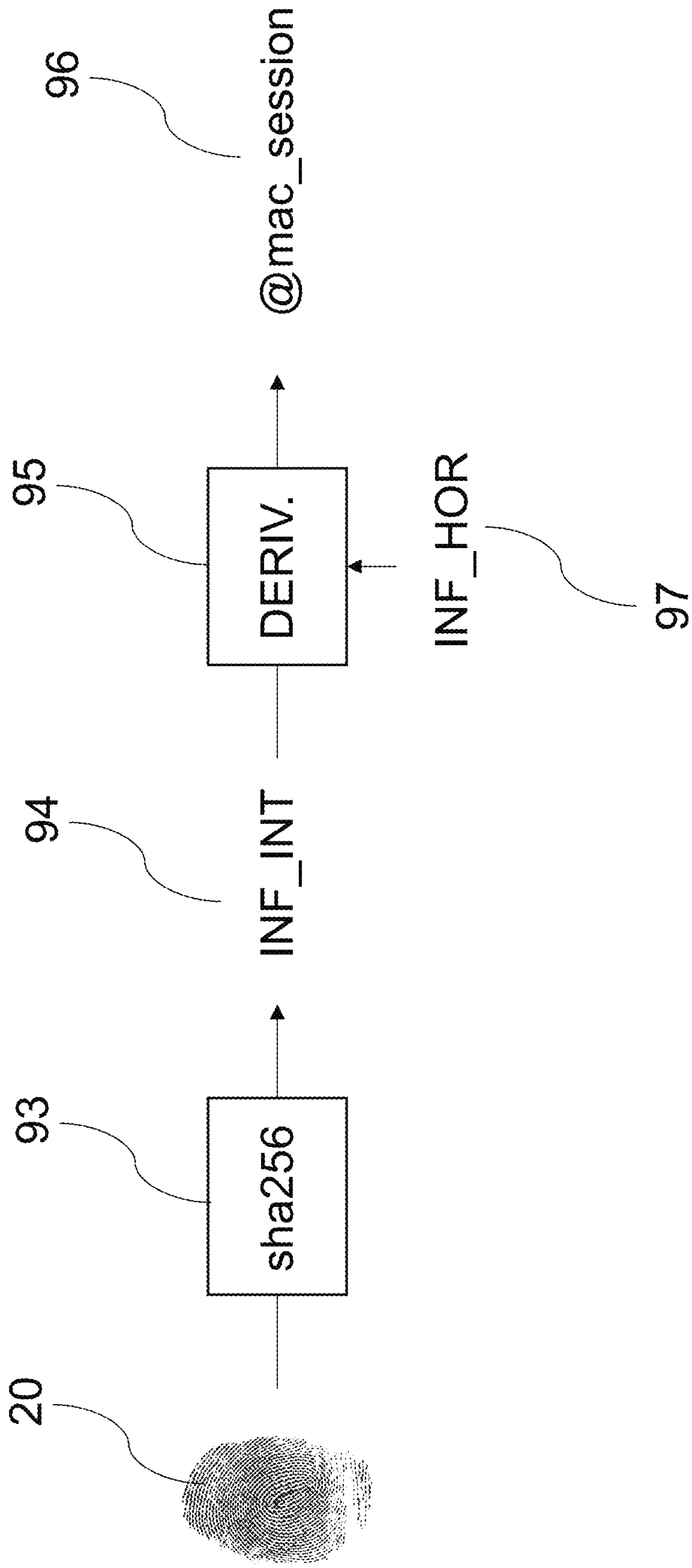
FIG. 9 illustrates in the form of a flowchart a third embodiment of the development, in which the item of information derived from a user's biometric print is a MAC address generated on the fly for the user terminal, by deriving a common key on the access gateway and on the user terminal.

FIG. 9 et seq. illustrate a third embodiment of the method according to the development, in which the item of information derived from the user's biometric print is a MAC address that changes however each time the user logs on again. This third embodiment of the development is advantageous in that it makes it possible to adhere to the new constraints, about to becoming the new de facto standard, of random MAC addresses on the same WLAN network.

To do this, a MAC address is generated on the fly for the user terminal, by deriving a common key on the access gateway and on the user terminal from the user's biometric print. The general principle of this third embodiment is illustrated by the flowchart of FIG. 9, that shows the implementation of a common key derivation algorithm on the user terminal as well as on the access gateway.

In these two items of equipment, the user's fingerprint 20 is fed into a hash function 93, for example sha-256, sha-1 or md5, whose result INF_INT 94 is an internal representation of the print. A key derivation function DERIV 95 receives as input parameters, on the one hand, the internal representation of the print INF_INT 94, and, on the other hand, an item of timestamp information INF_HOR 97, and delivers at the output a session MAC address 96 that can be used by the terminal in its network access DHCP requests.

Figure 10:
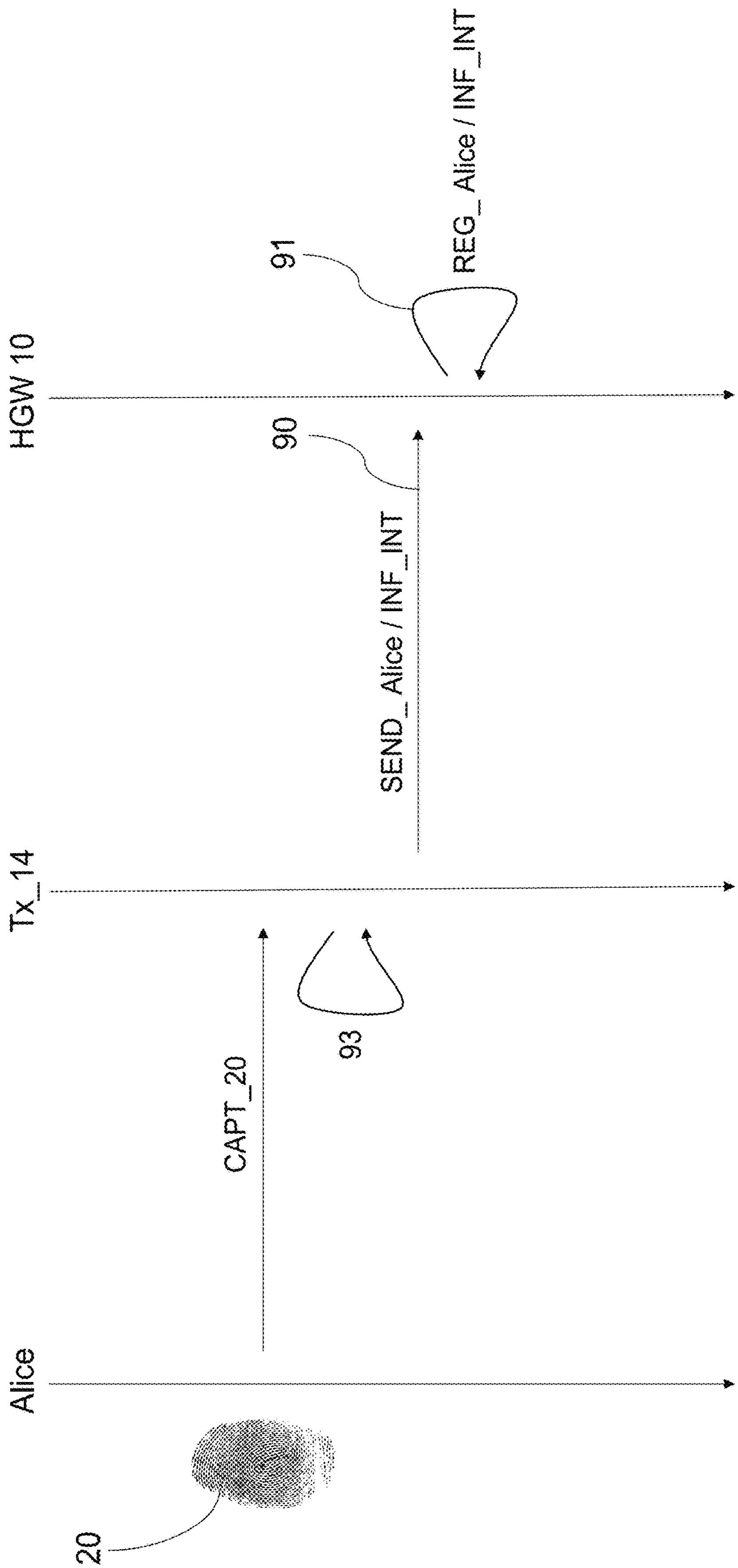
FIG. 10 shows a flowchart of the preliminary enrolment phase of the user with the access gateway according to the embodiment of FIG. 9.

This third embodiment requires a prior enrolment phase of the user with the access gateway, illustrated in FIG. 10.

It can be implemented on a preliminary basis, for example when configuring the local area network 2, or when users first connect to the access gateway HGW 10. As previously indicated, the user, for example Alice, enters their fingerprint 20 on the user terminal, for example the tablet Tx_14, in a step referenced CAPT_20. The latter is converted by hashing 93 into an internal representation of the print INF_INT 94.

In a step referenced 90, the user terminal Tx_14 sends to the home gateway HGW 10 a message containing Alice's identifier and the internal representation of the print INF_INT 94 (SEND_Alice/INF_INT). This data is stored in association in the gateway HGW 10 in a step referenced 91.

At the same time, the gateway HGW 10 also stores a static correspondence table, called permission table, that stores in association the internal representations INF_INT 94 of the prints of each of the users of the local area network 2, and all the access rules (permissions and prohibitions, time restrictions, etc.) set for these users by the network administrator.

Figure 11:
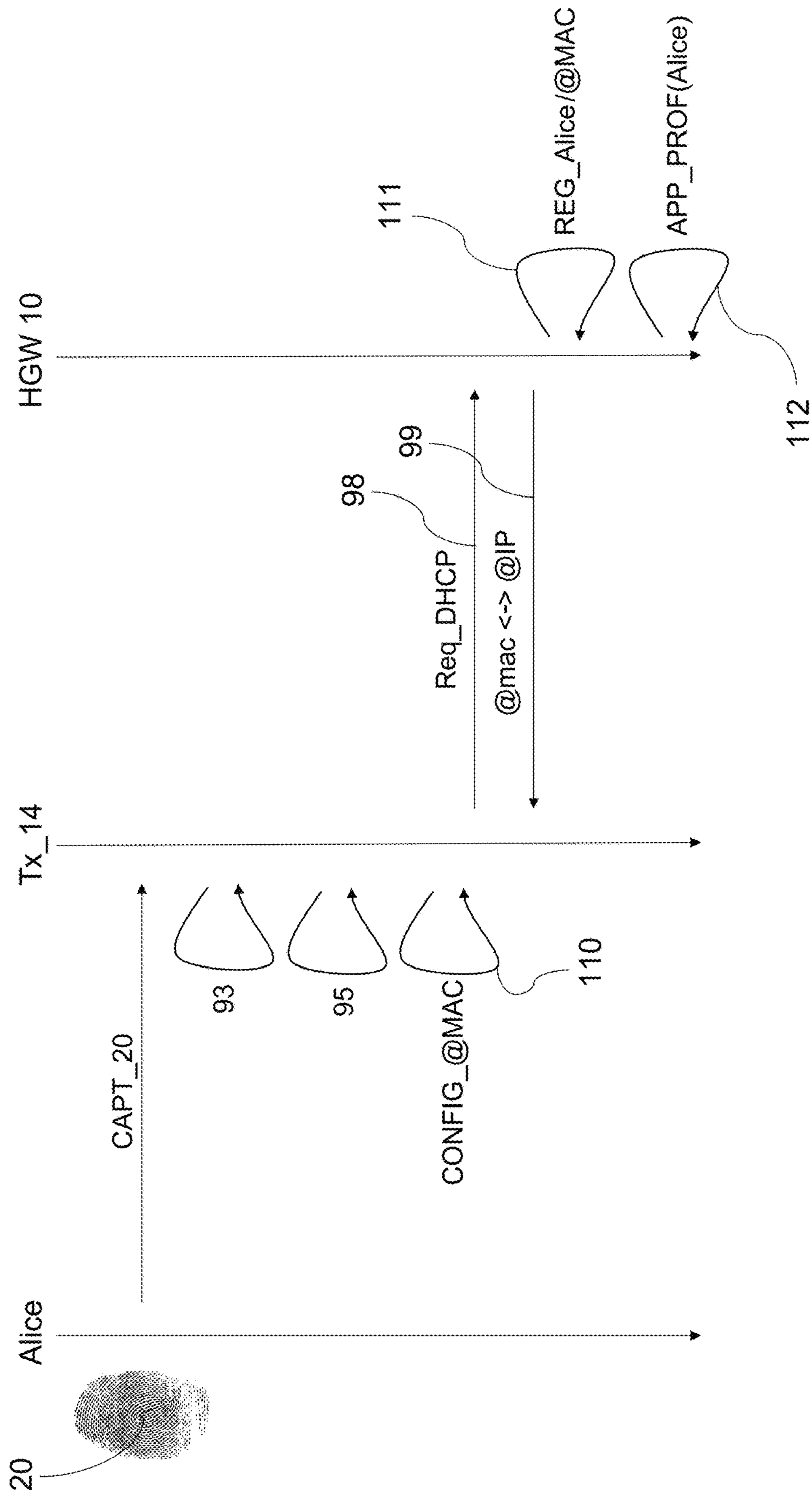
FIG. 11 illustrates in the form of a flowchart the authentication phase of a user and their associated terminal when attempting to connect to the access gateway according to the embodiment of FIG. 9.

FIG. 11 illustrates in the form of a flowchart the authentication phase of a user and their associated terminal when attempting to connect to the access gateway HGW 10. As previously indicated, the user Alice enters CAPT_20 her fingerprint 20, by means of her user terminal Tx_14. The latter, in accordance with the flowchart of FIG. 9, applies a hash function 93 and a key derivation function 95 to generate a session MAC address 96. In a step referenced 110, it then configures its network interface based on this new session MAC address 96, that replaces the default MAC address supplied by the manufacturer of the Ethernet card. This is the MAC address 96 it indicates in the DHCP request 98 it sends to the access gateway HGW 10, when attempting to connect to the local area communication network 2. In case the authentication of the terminal Tx_14 by the access gateway HGW 10 is successful, the latter sends back to the terminal Tx_14, in a step referenced 99, the IP address allocated in association with the MAC address 96 appearing in its DHCP request 98.

According to this third embodiment, the user terminal 14 is therefore authenticated according to a traditional authentication protocol, as normalised, based on the MAC address announced by the terminal in its DHCP request.

Upon completion of this authentication, it is possible to establish an association 111 between the MAC address 96 of the user terminal and the user identifier, and therefore to apply 112 to the terminal the access profile that has been defined by the network administrator for this user.

Indeed, thanks to the joint use of the static permission table and the dynamic MAC address table, it is easy to identify the association between user access control rules and MAC addresses of the user terminals, and therefore to plan Internet access reliably or to implement effective and secure parental control.

By merging the static permission table and the dynamic MAC address table, the gateway HGW 10 can associate access permissions with the various MAC addresses of the user terminals of the local area network. In the example of FIG. 11, the gateway HGW 10 can thus, in a step referenced 112, apply to Alice's terminal 14 the access profile that has been defined for her by her parents.

Naturally, authentication by the access gateway of the user terminal requires a verification of the MAC address 96 announced in the DHCP request 98. The calculation of rotating MAC addresses, in real time, on the terminal side and access gateway side, is now described in more detail in FIGS. 11 and 12.

Figure 12:
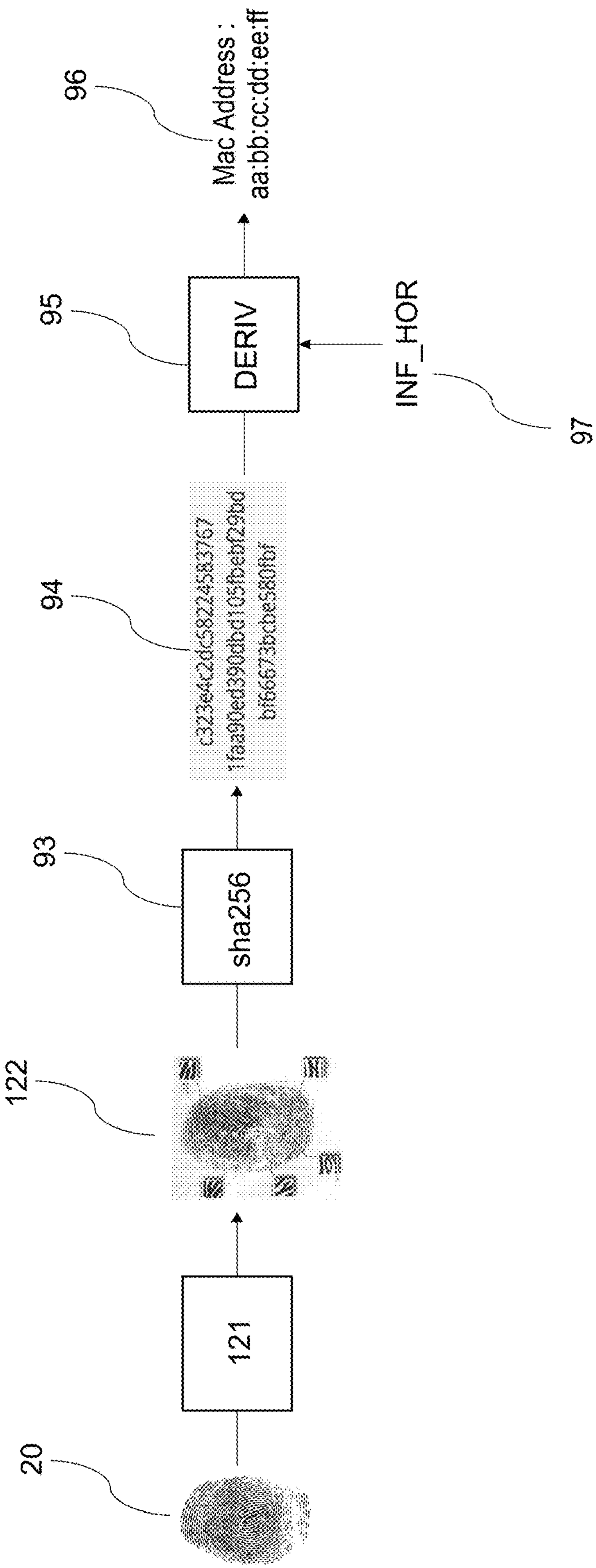
FIG. 12 shows the sequence of steps implemented on the user terminal side to generate a session MAC address according to the embodiment of FIG. 9.

FIG. 12 shows the sequence of steps implemented on the user terminal Tx_14 side to generate its session MAC address 96. As in all embodiments described previously, the user Alice enters her fingerprint 20 by placing her finger (for example her right index finger) on the screen of the tablet 14. An algorithm for processing 121 the image of this fingerprint is used to extract a certain number of local singular points, also known as minutiae, sufficient in number to allow robust, or reliable, identification of Alice. In FIG. 12, for the sake of simplicity, only five minutiae have been illustrated, but such a robust representation may require a larger number of minutiae, for example twelve or more. Upon completion of this robust transformation 121 of Alice's fingerprint, a robust representation 122 of her print is obtained, which makes it possible to identify Alice reliably, but which does not make it possible to reconstruct her full fingerprint reversibly, the confidentiality and protection of which therefore remain assured.

The user terminal 14 applies to this robust representation 122 a hash function 93, for example of the sha-256 (Secure Hash Algorithm), sha-1 or even md5 (Message Digest) type, that delivers a sequence 94 of sixty-four hexadecimal characters that forms an internal representation of the fingerprint 20, which is stored in the user terminal Tx_14, instead of the fingerprint itself, in order to ensure the confidentiality and integrity of the latter, and to prevent any fraudulent use thereof. In a step referenced 95, a PBKDF2 key derivation function generates, from this internal representation INF_INT 94 and from an item of timestamp information INF_HOR 97 corresponding to the current time, a session MAC address 96 of the form aa:bb:cc:dd:ee:ff. Preferably, this current time INF_HOR 97 is rounded off on the terminal side to multiples of five minutes (or any other chosen time granularity), as will be understood in more detail later in relation to FIG. 13. For example, at 10:16, the item of timestamp information INF_HOR is rounded to 10:15, and at 10:18, the item of timestamp information INF_HOR is rounded to 10:20.

It is recalled that the generic derivation function PBKDF2 can be written as:

DK=PBKDF2(PRF, Password, Salt, c, dkLen), where
- DK is the key derived by this function,
- PRF is a pseudo-random function to be used for each derivation,
- Password is the password from which to derive the new key,
- Salt is a salt for the random function,
- C is the number of iterations to be performed, and
- dkLen is the length of the derived key.

In this third embodiment, DK therefore represents the session MAC address 96 sought to be derived from the user's biometric print. To do this, the following input parameters are therefore used for example for the PBKDF2 key derivation function:

- PRF=HMAC-SHA1;
- Password=INF_INT, the internal representation 94 of the print;
- Salt=timestamp_unix (rounded to the nearest 5 minutes);
- C=4096 (arbitrarily); and
- dkLen=48 bits.

Figure 13:
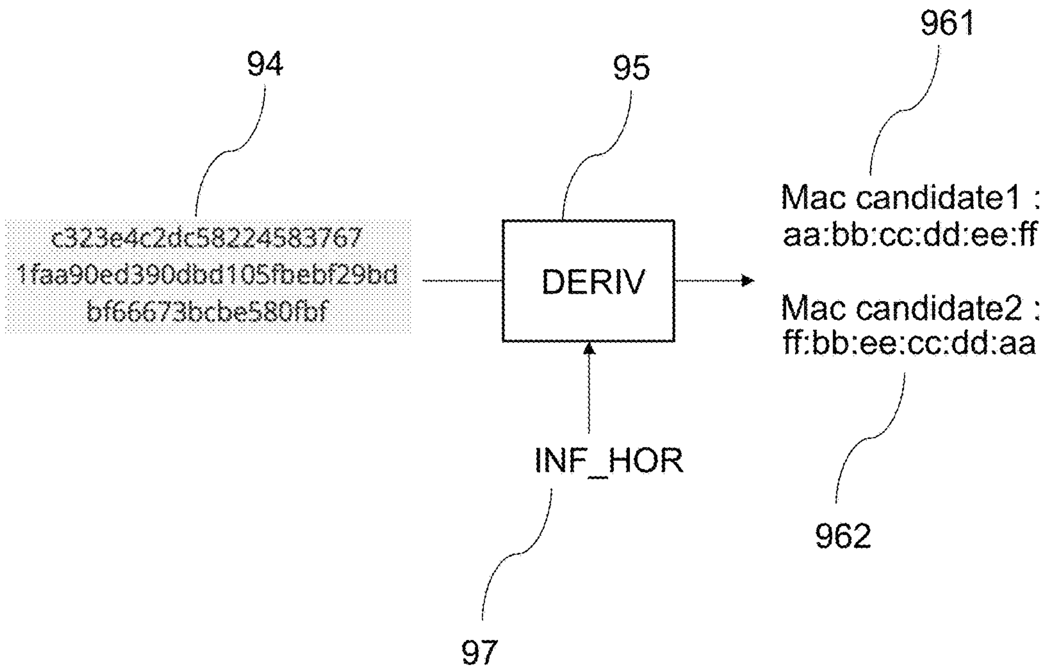
FIG. 13 shows the sequence of steps implemented on the access gateway side to generate a session MAC address according to the embodiment of FIG. 9.

FIG. 13 shows the sequence of steps implemented in parallel in the access gateway HGW 10 for the same session MAC address generation.

Like the user terminal Tx_14, the access gateway HGW 10 applies a PBKDF2 key derivation function to the internal representation 94 received during the preliminary enrolment phase of FIG. 10, in a step referenced 95. However, as this MAC address calculation is based on the current time, the access gateway HGW 10 preferably generates several candidate MAC addresses, in order to be robust to any clock offsets between the user terminal Tx_14 and the gateway HGW 10. To do this, a time granularity is first determined that ensures this robustness, and conditions the number of candidate MAC addresses to be calculated.

Thus, choosing for example a granularity of five minutes:
- At 10:15, the gateway HGW 10 calculates the MAC addresses 961 for INF_HOR=10:10 and 962 for INF_HOR=10:15;
- At 10:17, the gateway HGW 10 calculates the MAC addresses 961 for INF_HOR=10:10 and 962 for INF_HOR=10:15;
- At 10:18, the gateway HGW 10 calculates MAC addresses 961 for INF_HOR=10:15 and 962 for INF_HOR=10:20.

Each time a new user terminal connects, the access gateway HGW 10 calculates two (or more) candidate MAC addresses 961 and 962, based on two items of timestamp information corresponding to the current time at the chosen time granularity, for each user stored in database. Upon receipt of the DHCP request 98 of FIG. 10, the access gateway HGW 10 compares the MAC address 96 received from the terminal Tx_14 with each of the two candidate MAC addresses 961 and 962 it just calculated for the latter. If the comparison is positive, the user terminal is authenticated, the user is therefore recognised and the gateway can apply the access rights that are specific to them. Otherwise, the gateway applies to the terminal Tx_14 a default access policy.

Figure 14:
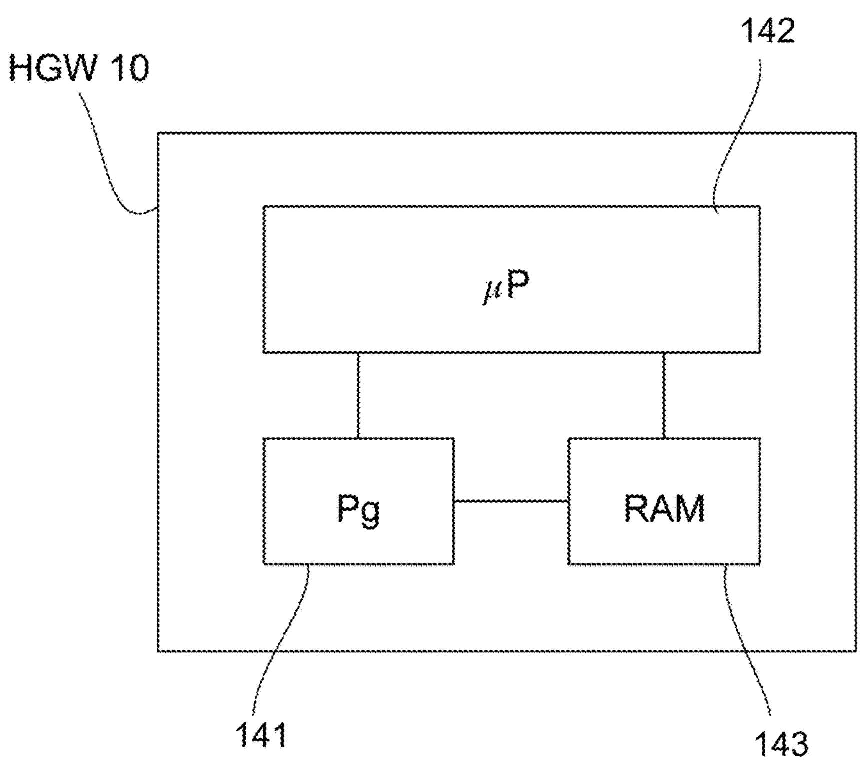
FIG. 14 shows in the form of a simplified diagram the hardware structure of an access gateway according to the various embodiments of the development.

In relation to FIG. 14, the hardware structure of a home gateway HGW 10 according to one embodiment of the development, comprising a module for authenticating a user terminal based on an item of information derived from a biometric print of a user of this terminal, and a module for controlling access of user terminals to the network, by authentication of the user terminal based on the item of information derived from the biometric print, and configured to apply to the user terminal a network access profile personalised for the user to whom the biometric print belongs, is now presented.

The term "module" can correspond to a software component as well as to a hardware component or a set of hardware and software components, a software component itself corresponding to one or more computer programs or subprograms, or more generally, to any element of a program able to implement a function or set of functions.

More generally, such a home gateway HGW 10 comprises a random access memory 143 (a RAM memory, for example), a processing unit 142 equipped for example with a processor and controlled by a computer program representative of the authentication and terminal access control modules, stored in a read-only memory 141 (or ROM memory, for example a hard disk). At initialisation, the code instructions of the computer program are for example loaded into a random access memory 143 before being executed by the processor of the processing unit 142. The random access memory 143 contains in particular the various correspondence tables (permission, identity, MAC address, etc. tables) described above in relation to the embodiments of FIGS. 2 to 13. The processor of the processing unit 142 controls the various message exchanges enabling authentication of the user terminal, the allocation of an IP address to the terminal, the application to the latter of an access profile personalised depending on the identity of its user, and more generally the message exchanges enabling access control of user terminals to the resources of gateway 10 and the networks 1 and 2, in accordance with FIGS. 2 to 13.

FIG. 14 only shows a particular one of several possible ways of realising the home gateway HGW 10, so that it executes the steps of the method detailed above, in relation to FIGS. 2 to 13 (in any one of the various embodiments, or in a combination of these embodiments). Indeed, these steps may be implemented indifferently on a reprogrammable computing machine (a PC computer, a DSP processor (Digital Signal Processor) or a microcontroller) executing a program comprising a sequence of instructions, or on a dedicated computing machine (for example a set of logic gates such as an FPGA (Field Programmable Gate Array) or an ASIC (application-specific integrated circuit), or any other hardware module).

In the case where the home gateway HGW 10 is realised with a reprogrammable computing machine, the corresponding program (that is, the sequence of instructions) can be stored in a removable (such as, for example floppy disk, CD-ROM or DVD-ROM (Digital Versatile Disc-Read Only Memory)) or non-removable-storage medium, this storage medium being partially or totally readable by a computer or a processor.

The various embodiments have been described above in relation to a home gateway of the Livebox® type, but can more generally be implemented in any gateway or router.

Figure 15:
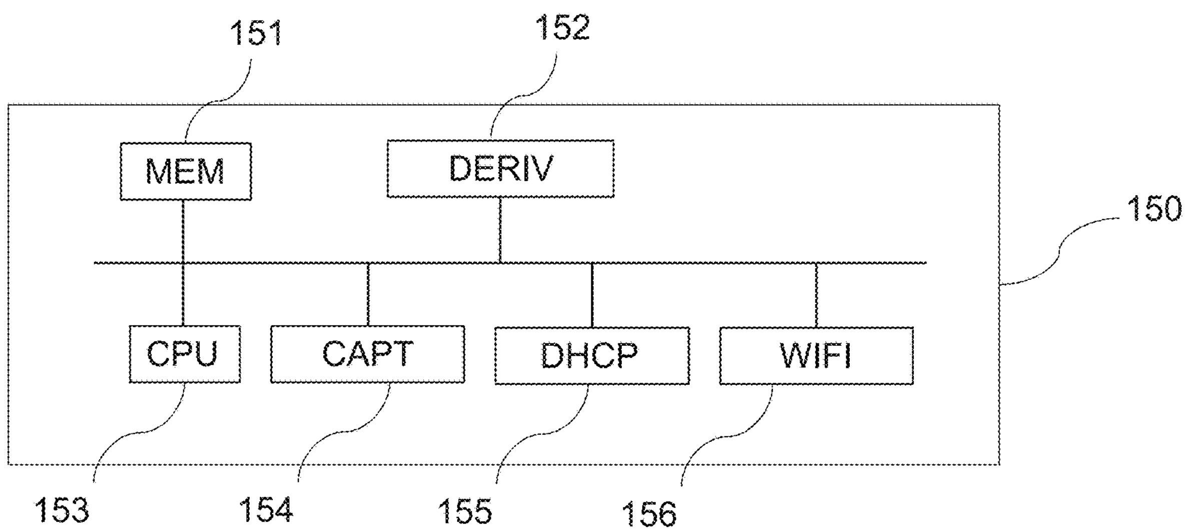
FIG. 15 shows in the form of a simplified diagram the hardware structure of a user terminal according to the first and third embodiments of the development.

FIG. 15 shows an architecture of a user terminal 150 that may be any of the user terminals 11 to 14 of FIG. 1, according to one of the embodiments of the development.

The user terminal 150 typically comprises memories MEM 151 associated with a processor CPU 153. The memories can be of type ROM (Read Only Memory), RAM (Random Access Memory) or Flash. The user terminal 150 comprises a module CAPT 154 for capturing a biometric print of a user. In the case where the user terminal 150 has a touch screen, as is the case of the smartphone 11 or the tablet 14, this module is an integral part of the terminal. In other cases, this module CAPT 154 may consist of a remote module connected, for example, to the laptop 12 or to the home computer 13 by means of a wired or wireless link.

The user terminal 150 also comprises a module DERIV 152 for deriving an item of authentication information of the user from the biometric print captured by the module CAPT 154. Such a derivation module DERIV 152 is able to analyse the image of the print captured by the capture module CAPT 154 in order to extract a robust representation therefrom, by identifying a sufficient number of singular points of the print, and to apply a hash function (of the sha-256 type, for example) to this robust representation, in order to obtain the desired item of authentication information. In the first embodiment described in relation to FIGS. 2 to 4, the derivation module DERIV 152 is also configured to generate a MAC address from the result of this hash, for example by simple truncation or by applying a PBKDF2 key derivation function. In the second embodiment described in relation to FIGS. 5 to 8, the derivation module DERIV 152 is also configured to generate a password from the result of this hash, which may be the result of the hash itself, or a password generated by applying a PBKDF2 key derivation function to the result of the hash. Finally, in the third embodiment described in relation to FIGS. 9 to 13, the derivation module DERIV 152 is also configured to generate a MAC address from the result of this hash and an item of timestamp information, by applying a PBKDF2 key derivation function.

The user terminal 150 also comprises a module DHCP 155 for transmitting an access request to the access gateway based on the item of information supplied by the derivation module DERIV 152 and a module WIFI 156 able to transmit and receive messages to and from the gateway for accessing the local area communication network. In particular, in the first and third embodiments of the development, the module DHCP 155 is able to configure the network interface of the user terminal 150 with the MAC address generated by the derivation module DERIV 152, and the module WIFI 156 is able to transmit a DHCP request containing this MAC address to the gateway 10.

The user terminal 150 according to one embodiment of the development may also contain other modules (not shown) such as a hard disk for storing robust representations of the biometric prints, possibly in hashed form, a user interface module (screen, keyboard, mouse, etc.), a sound management module, etc.

It will be noted again that the term "module" can correspond to a software component as well as to a hardware component or a set of hardware and software components, a software component itself corresponding to one or more computer programs or sub-programs, or more generally, to any element of a program able to implement a function or set of functions as described for the relevant modules. In the same way, a hardware component is any element of a hardware assembly able to implement a function or set of functions for the relevant module (integrated circuit, smart card, memory card, etc.).

More generally, such a user terminal 150 comprises a random access memory MEM 151 (for example a RAM memory), a processing unit equipped for example with a processor CPU 153, and controlled by a computer program, and comprising code instructions representative of the modules for capturing a biometric print CAPT 154, for deriving DERIV 152 an item of user authentication information from the biometric print, for transmitting an access request DHCP 155 to the access gateway based on the derived item of information and of module WIFI 156, stored in a read-only memory (for example a ROM memory or a hard disk). At initialisation, the code instructions of the computer program are for example loaded into the random access memory before being executed by the processor CPU of the processing unit. The random access memory contains in particular the robust representation of the user's biometric print, possibly in hashed form. The processor of the processing unit controls the capture of the biometric print, the derivation of an item of authentication information (MAC address or password) from the latter, and its use in an authentication phase, either with a captive portal or by sending a DHCP request containing it to the access gateway.

FIG. 15 only shows a particular one of several possible ways of realising the user terminal 150, so that it executes the steps of the method detailed above, in relation to FIGS. 2 to 13 (in any one of the various embodiments, or in a combination of these embodiments). Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

The invention claimed is:

1. A method of access control to a wireless local area communication network, comprising a gateway for accessing the local area network and a plurality of user terminals configured to be connected to the local area network via the access gateway, wherein the access control of each of the user terminals to the network comprises:

authenticating the user terminal based on an item of information derived from a biometric print of a user of the user terminal; and applying, to the user terminal, a network access profile personalized for the user to whom the biometric print belongs.

2. The access control method according to claim 1, wherein the item of information derived from the biometric print is a MAC address generated by hashing a robust representation of the biometric print.

3. The access control method according to claim 2, wherein the method comprises pre-registering the user terminal with the access gateway comprising storing the generated MAC address in association with an identifier of the user.

4. The access control method according to claim 1, wherein the item of information derived from the biometric print is a password generated by hashing a representation of the biometric print.

5. The access control method according to claim 4, wherein the authentication of the user terminal is implemented on a captive portal based on an identifier of the user and a hash of the password.

6. The access control method according to claim 4, wherein the method comprises pre-registering the user terminal with the access gateway comprising storing the hash of the generated password in association with an identifier of the user.

7. The access control method according to claim 1, wherein the item of information derived from the biometric print is a MAC address derived, based on an item of timestamp information, from a hash of a representation of the biometric print.

8. The access control method according to claim 7, wherein the method comprises pre-registering the user terminal with the access gateway comprising storing the hash of the representation of the biometric print in association with an identifier of the user.

9. The access control method according to claim 8, wherein the authentication comprises the generation, by the access gateway, of at least two candidate MAC addresses for the user terminal, from the hash of the representation of the stored biometric print and at least two items of timestamp information separated by a predetermined time duration to account for a possible clock offset between the user terminal and the access gateway, and the comparison of the at least two candidate MAC addresses with the item of information derived from the biometric print received from the user terminal.

10. A processing circuit comprising a processor and a memory, the memory storing program code instructions of a computer program for implementing the control access method according to claim 1, when the computer program is executed by the processor.

11. The access control method according to claim 1, wherein the representation of the biometric print comprises a reduced number of characteristics extracted from the biometric print, allowing an identification of the user.

12. A gateway for accessing a local area communication network, the local area network comprising a plurality of user terminals configured to be connected to the local area network via the access gateway, wherein the gateway comprises:

an authentication module configured to authenticate a user terminal based on an item of information derived from a biometric print of a user of the user terminal; and a control module configured to control access of the authenticated user terminal, and configured to apply to the user terminal a network access profile personalized for the user to whom the biometric print belongs, and wherein the item of information derived from the biometric print is a MAC address generated by a key derivation function from an item of timestamp information and a hash of a representation of the biometric print.

13. A method of access of a user terminal to an access gateway to a wireless local area communication network, wherein the method comprises:

capturing a biometric print of a user;

deriving an item of authentication information of the user from the captured biometric print; and transmitting an access request to the access gateway based on the derived item of information, and wherein the item of information derived from the biometric print is a MAC address generated by a key derivation function from an item of timestamp information and a hash of a representation of the biometric print.

14. The access method according to claim 13, wherein the derivation of an item of authentication information comprises:

transforming the captured print into a representation of the print;

generating the MAC address by hashing the representation of the print;

and in that, prior to the transmission of an access request, the method comprises a configuration of a network interface of the user terminal with the generated MAC address.

15. A processing circuit comprising a processor and a memory, the memory storing program code instructions of a computer program for implementing the access method according to claim 13, when the computer program is executed by the processor.

16. A user terminal configured to be connected to a wireless local area communication network via an access gateway, wherein the user terminal comprises:

a module for capturing a biometric print of a user;

a module for deriving an item of authentication information of the user from the captured biometric print; and a module for transmitting an access request to the access gateway based on the derived item of information, and wherein the item of information derived from the biometric print is a MAC address generated by a key derivation function from an item of timestamp information and a hash of a representation of the biometric print.

* * * * *